United States Patent [19]

Okuda

[11] 4,167,859

[45] Sep. 18, 1979

[54] UNIVERSAL JOINTS OF THE CARDAN TYPE FOR DRIVE SHAFT OF ROLLING MILLS

[75] Inventor: Hiroji Okuda, Kawai, Japan

[73] Assignee: Koyo Seiko Company Limited, Osaka, Japan

[21] Appl. No.: 874,653

[22] Filed: Feb. 1, 1978

Related U.S. Application Data

[63] Continuation of Ser. No. 709,716, Jul. 29, 1976, abandoned.

[30] Foreign Application Priority Data

Aug. 18, 1975 [JP] Japan .................................. 50-113867

[51] Int. Cl.² .............................................. F16D 3/26
[52] U.S. Cl. ..................... 64/17 R; 64/17 A
[58] Field of Search ............. 64/17 R, 17 A

[56] References Cited

U.S. PATENT DOCUMENTS

| 2,447,881 | 8/1948 | Warner | 64/17 A |
| 2,891,392 | 6/1959 | Wildhaber | 64/17 R |
| 3,296,830 | 1/1967 | Runkle | 64/17 R |

FOREIGN PATENT DOCUMENTS

| 1195688 | 5/1959 | France | 64/17 R |
| 195226 | 4/1967 | U.S.S.R. | 64/17 R |

*Primary Examiner*—Charles J. Myhre
*Assistant Examiner*—R. C. Turner
*Attorney, Agent, or Firm*—Mason, Fenwick & Lawrence

[57] ABSTRACT

A universal joint assembly comprising a yoke to be connected to a drive shaft, another yoke to be connected to a driven shaft, a spider and needle bearings for rotatably supporting the trunnions of the spider. The joint is used to interconnect the drive shaft and the driven shaft at an angle of intersection of up to 15 degrees. The ratio of the diameter d of the trunnion to the allowable swing diameter D of the universal joint, namely d/D, is greater than 24%.

2 Claims, 5 Drawing Figures

UNIVERSAL JOINTS OF THE CARDAN TYPE FOR DRIVE SHAFT OF ROLLING MILLS

This is a continuation, of application Ser. No. 709,716 now abandoned, filed July 29, 1976.

BACKGROUND OF THE INVENTION

The present invention relates to universal joints of the Cardan type, and more particularly to universal joints including a spider for use in the drive system of rolling mills.

As shown in FIGS. 3 and 4, universal joints of the Cardan type generally comprise a pair of yokes 1 splined or otherwise connected to a drive shaft and a driven shaft (not shown) respectively and rotatable therewith, a spider 2 provided between the yokes 1, and needle bearings 4 housed in the bores formed in the yokes 1 perpendicular to their axes to rotatably support the trunnions 3 of the spider 2. However, since the universal joints of this type have been provided with the development of motor vehicles, they are adapted for high-speed, low-torque rotation and are not suited for use in the drive system of rolling mills or the like which involves low-speed, high-torque rotation.

It is known that when a drive system incorporating a Cardan-type universal joint including needle bearings operates for torque transmission, the trunnions of the spider are subjected to fatigue bending stress and shearing stress and are therefore most susceptible to failure.

For a better understanding, the fatigue bending stress alone will be discussed with reference to FIG. 5.

Generally the fatigue bending stress $\sigma_B$ is expressed by:

$$\sigma_B = \frac{32 \times F \times h \times d}{\pi(d^4 - d_1^4)} \quad (1)$$

where
- d: diameter of trunnion of spider.
- $d_1$: diameter of oil port in spider.
- F: load.
- h: loading length.

The torque to be transmitted, T, is expressed by:

$$T = F \times 2r \quad (2)$$

where r is radius of force.

Equations (1) and (2) give $$\sigma_B = \frac{32 \times T \times h \times d}{\pi(d^4 - d_1^4) \times 2r} \quad (3)$$

The diameter $d_1$ of the oil port in the spider, when raised to the fourth power, is so small as to be negligible as compared with the trunnion diameter d. Therefore it follows from Equation (3) that the fatigue bending stress is given approximately by $$\sigma_B = \frac{32 \times T \times h \times d}{\pi d^4 \times 2r} \quad (4)$$

Assuming that the fatigue bending stress $\sigma_B$, the radius of force, r, and loading length h are constant, Equation (4) will be $$T = c \cdot d^3$$

where c is a constant. Thus the torque T to be transmitted is in proportion to the third power of the trunnion diameter d. In other words, the torque T can be increased with increasing diameter d of the spider trunnion, namely with increasing shaft diameter, in proportion to the third power of the diameter d.

However, the conventional spider universal joints, which have been improved with the development of motor vehicles as already stated, are adapted to a high-speed, low-torque operation. They are designed for an increased angle of intersection, $\alpha$, namely they have an increased clearance S shown in FIG. 4. Because of such construction, the increase in the trunnion diameter d is limited. Moreover, with the joints of the type illustrated in FIG. 4 which include needle bearings 4 comprising needle rollers 4a and a needle case 4b, in other words with those fabricated from an increased number of parts, the increase of trunnion diameter d is more greatly limited.

Accordingly when such Cardan-type universal joint is used in the drive system of rolling mills or the like which involve low-speed, high-torque rotation, there arises the problem of insufficient amount of transmission of torque, consequently leading to insufficiency of the strength of the spider. In fact the convention universal joints of this type were not usable for a majority of rolling mills with a few exceptions where low torques are involved.

In order to clarify this more specifically, the relation between the torque T and allowable swing diameter D, i.e. $T/D^3$, is calculated, and the value will be hereinafter referred to as a "torque factor $T_o$." Listed below are the torque factor $T_o$ and angle $\alpha$ of intersection of Cardan-type universal joints of the prior art.

|  | Torque factor $T_o$ (ton·m/m$^3$) | Angle of intersection($\alpha$) |
|---|---|---|
| For motor vehicles | 80–120 | 25° |
| For agricultural machines | 80–120 | 45° |
| For construction equipment | 100–150 | 15° |

For use in the drive systems of various rolling mills, however, universal joints of the Cardan type require the torque factors $T_o$ given below.

|  | Torque factor $T_o$ (ton·m/m$^3$) |
|---|---|
| Hot strip mills | 800–1400 |
| Cogging mills and plate mills | 400–600 |
| Rod mills | 150–250 |
| Bar mills | 150–300 |
| Cold strip mills | 200–400 |

Thus the conventional universal joints of the Cardan type are barely usable for rod mills and bar mills, but they are unserviceable for other rolling mills and therefore applicable only to limited use.

SUMMARY OF THE INVENTION

The object of this invention is to overcome the foregoing drawbacks of conventional universal joints of the Cardan type and to provide Cardan-type universal joints which are usable in the drive system of any of various rolling mills such as those referred to above.

The present invention provides a universal joint of the Cardan type adapted to interconnect a drive shaft and a driven shaft at an angle of intersection of up to 15°, the joint being characterized in that the ratio of the diameter d of the spider trunnions to the allowable swing diameter D of the universal joint, namely d/D, is greater than 24%, whereby the amount of the torque to be transmitted by the joint can be greatly increased as compared with the conventional universal joints of the same type.

Further according to this invention, the strength of the trunnions can be increased by improving the spider trunnions in both the quality of the material and the heat treatment therefor, for example by refining treatment.

This invention also achieves great improvements in Cardan-type universal joints composed of an increased number of parts as illustrated in FIG. 4, namely those in which the needle bearing 4 comprises needle rollers $4a$ and a needle case $4b$. Moreover, by providing the needle rollers directly between the trunnion and a bearing cover secured to the yoke while eliminating the needle case, the trunnion diameter can be further increased, permitting the joint to transmit increased torque and to have improved strength.

More specifically, the joints of this invention have a d/D ratio of greater than 24% and a higher torque factor $T_o$ of 400 to 1200 ton·m/m$^3$ and are thereby rendered operable in the drive system of any of various rolling mills. The present joints are effective in materially reducing the vibration and noise at the joint portions of rolling mill rolls and in rendering the joint portions operable free of maintenance.

Other objects and features of this invention will become more apparent from the following description.

DESCRIPTION OF THE PREFERRED EMBODIMENTS

Figure 1:
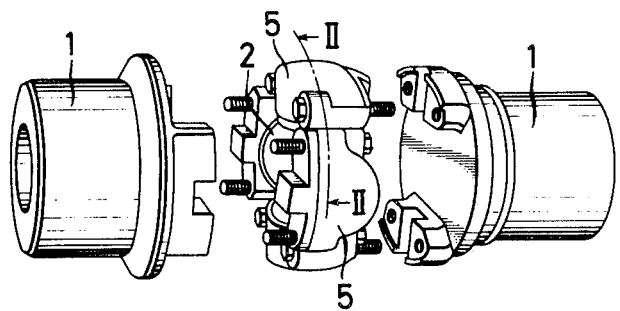
FIG. 1 is an exploded perspective view showing an embodiment of this invention.
Figure 2:
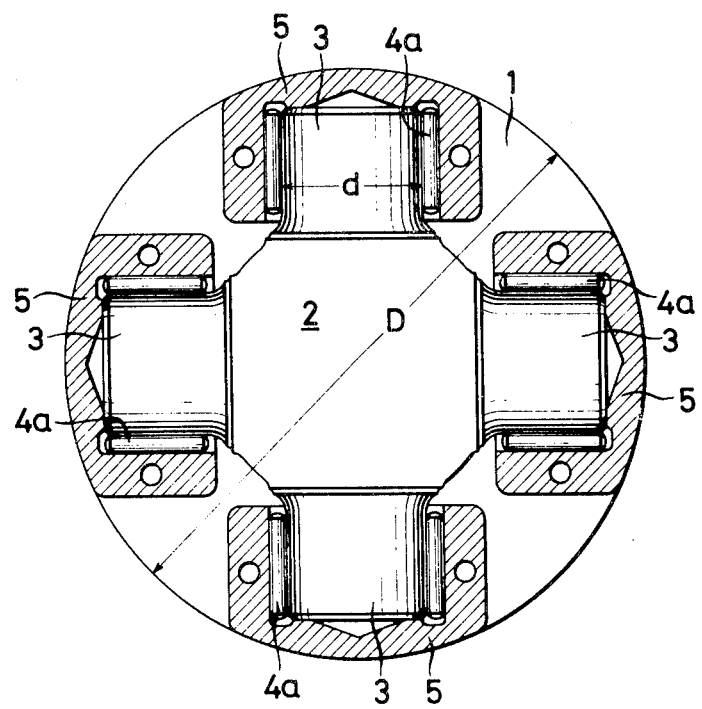
FIG. 2 is an enlarged view in cross section taken along the line II—II in FIG. 1, with needle cases eliminated.
Figure 3:
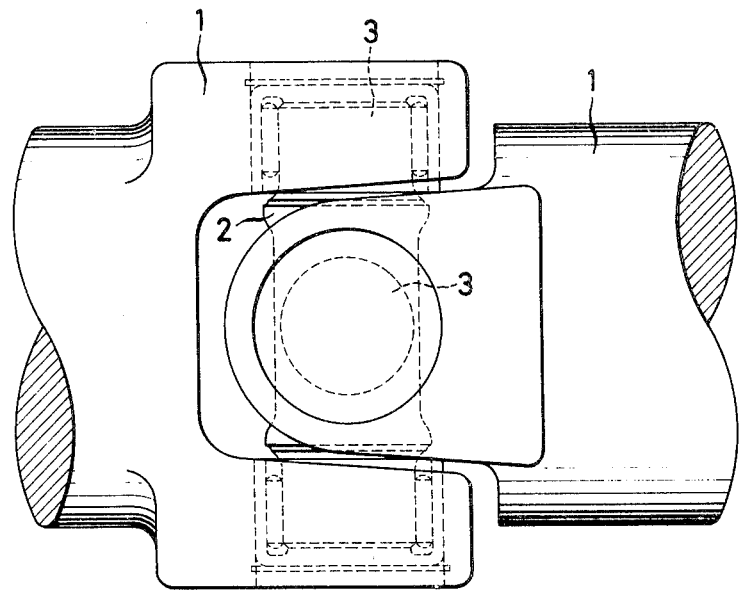
FIG. 3 is a front view of principal parts for illustration.
Figure 4:
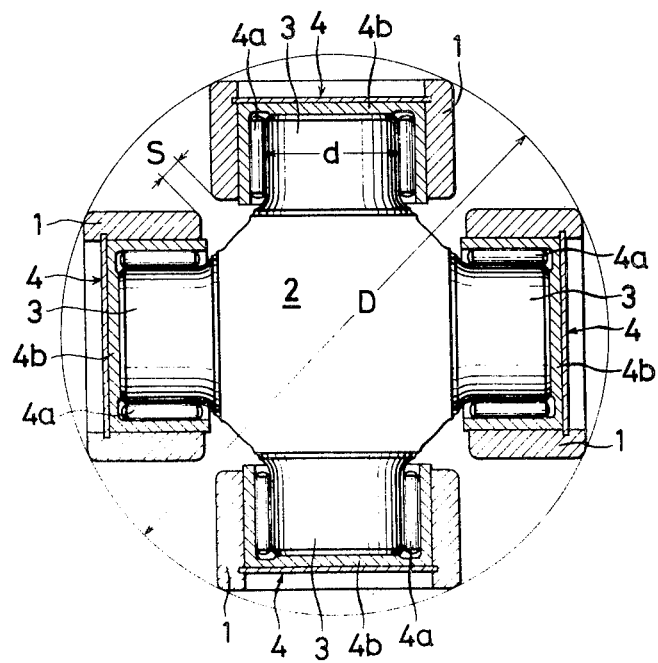
FIG. 4 is a cross sectional view of the principal parts in which needle cases are incorporated.
Figure 5:
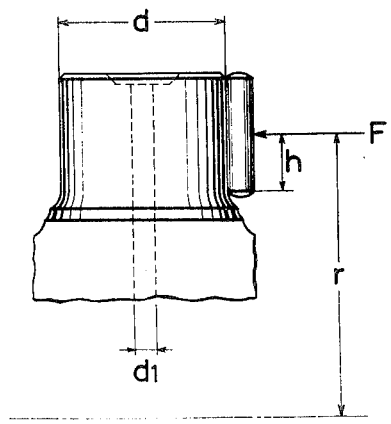
FIG. 5 is a view showing a spider trunnion for illustration.

A specific example of the construction of universal joint of the Cardan type has already been clarified with reference to FIGS. 3 to 5 showing a conventional device. This invention can be embodied more advantageously by eliminating the needle cases and providing needle rollers $4a$ directly between the trunnions 3 of a spider 2 and bearing covers 5 secured to yokes 1 as seen in FIGS. 1 and 2.

In these universal joints, the allowable swing diameter D and the diameter d of the trunnion of the spider are so determined that the d/D ratio is greater than 24%. The torque factors $T_o$ of the joints are found to be 400 to 1200 ton·m/m$^3$ as already described. The angle of intersection, $\alpha$, is up to 15 degrees. It has been confirmed that rolling mills do not require substantially great intersection angles and are operable satisfactorily within the above angular range.

Specific embodiments of this invention are given below.

| Embodiment 1 | |
|---|---|
| Allowable swing diameter | D: 110 mm |
| Radius of force | r: 40.0 mm |
| Loading length | h: 11.0 mm |
| Diameter of trunnion | d: 26.7 mm |
| Diameter of oil port in spider | $d_1$: 8.0 mm |
| Fatigue bending stress | $\sigma_B$: 32 kg/mm$^2$ |

In this case, the ratio of the trunnion diameter d to the allowable swing diameter D and the torque factor $T_o$ will be calculated.

(a) Ratio d/D $$\frac{d}{D} \times 100 = \frac{26.7}{100} \times 100 \approx 24.27\%$$

(b) Torque factor $T_o$ $$T_o = T/D^3 \tag{5}$$

From Equations (3) and (5), $$\sigma_B = \frac{32 \times T_o \times D^3 \times h \times d}{\pi(d^4 - d_1^4) \times 2r}$$

Therefore $$T_o = \frac{\sigma_B \times \pi(d^4 - d_1^4) \times 2r}{32 \times D^3 \times h \times d} \tag{6}$$

When the numerical values are substituted in Equation (6), $$T_o = \frac{32 \times \frac{10^{-3}}{10^{-6}} \times 3.14 \times (26.7^4 - 8^4) \times 10^{-12} \times 2 \times 40.0 \times 10^{-3}}{32 \times (110 \times 10^{-3})^3 \times 110 \times 10^{-3} \times 26.7 \times 10^{-3}}$$

$$\approx 324 \text{ ton·m/m}^3$$

| Embodiment 2 | |
|---|---|
| Allowable swing diameter | D: 1000 mm |
| Radius of force | r: 356.6 mm |
| Loading length | h: 87.9 mm |
| Diameter of trunnion | d: 279.4 mm |
| Diameter of oil port in spider | $d_1$: 30.0 mm |
| Fatigue bending stress | $\sigma_B$: 29 kg/mm$^2$ |

(a) Ratio d/D $$\frac{d}{D} \times 100 = \frac{279.4}{1000} \times 100 = 27.94\%$$

(b) Torque factor $T_o$
From Equation (6), $$T_o = \frac{29 \times \frac{10^{-3}}{10^{-6}} \times 3.14 \times (279.4^4 - 30.0^4) \times 10^{-12} \times 2 \times 356.6 \times 10^{-3}}{32 \times (1000 \times 10^{-3})^3 \times 87.9 \times 10^{-3} \times 279.4 \times 10^{-3}}$$

$$= 504 \text{ ton·m/m}^3$$

| Embodiment 3 | |
|---|---|
| Allowable swing diameter | D: 1500 mm |
| Radius of force | r: 560 mm |
| Loading length | h: 103.5 mm |
| Diameter of trunnion | d: 420 mm |
| Diameter of oil port in spider | $d_1$: 40 mm |
| Fatigue bending stress | $\sigma_B$: 29 kg/mm² |

(a) Ratio d/D $$\frac{d}{D} \times 100 = \frac{420}{1500} \times 100 = 28\%.$$

(b) Torque factor $T_o$
From Equation (6), $$T_o = \frac{29 \times \frac{10^{-3}}{10^{-6}} 3.14 \times (420^4 - 40^4) \times 10^{-12} \times 2 \times 560 \times 10^{-3}}{32 \times (1500 \times 10^{-3})^3 \times 103.5 \times 10^{-3} \times 420 \times 10^{-3}}$$

$$= 691 \text{ ton·m/m}^3$$

What is claimed is:

1. A high-torque universal joint of the Cardan type for the drive shaft of a rolling mill comprising:
   a yoke to be connected to the drive shaft and rotatable with the drive shaft in its direction of rotation,
   a yoke to be connected to a driven shaft and rotatable with the driven shaft which is at an angle of intersection with respect to the drive shaft of up to 15°,
   a spider connected to the yokes and having trunnions so dimensioned that the ratio of the trunnion diameter d to the allowable swing diameter D of the joint, d/D is greater than 24%, and
   a needle bearing for rotatably supporting each of the spider trunnions on the yoke, the needle bearing comprising needle rollers provided directly between the outer periphery of the trunnion and a bearing cover mounted on the yoke.

2. A high-torque universal joint of the Cardan type for the drive shaft of a rolling mill, especially a hot strip mill, comprising:
   a yoke formed integrally directly at an end of a drive shaft,
   a corresponding yoke formed integrally directly at an end of a driven shaft,
   a spider supported in the yokes by bearing cases and needle bearings,
   the spider having trunnions so dimensioned that the ratio of the trunnion diameter to the allowable swing diameter of the joint is in the range of 24% to 28%, and
   wherein the angle of intersection of the driven shaft with the drive shaft is in the range of 3° to 15°.

* * * * *